2,720,751

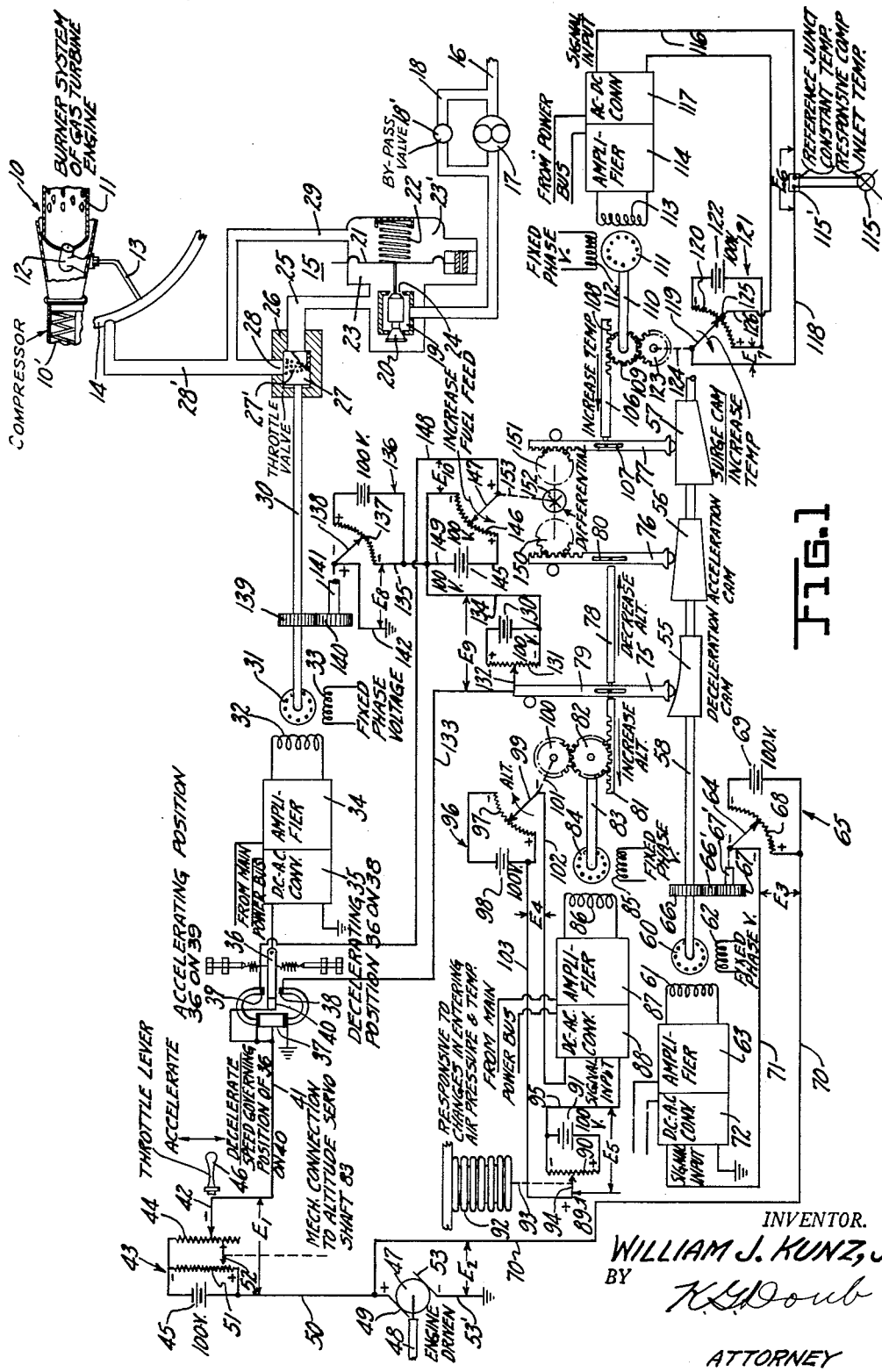

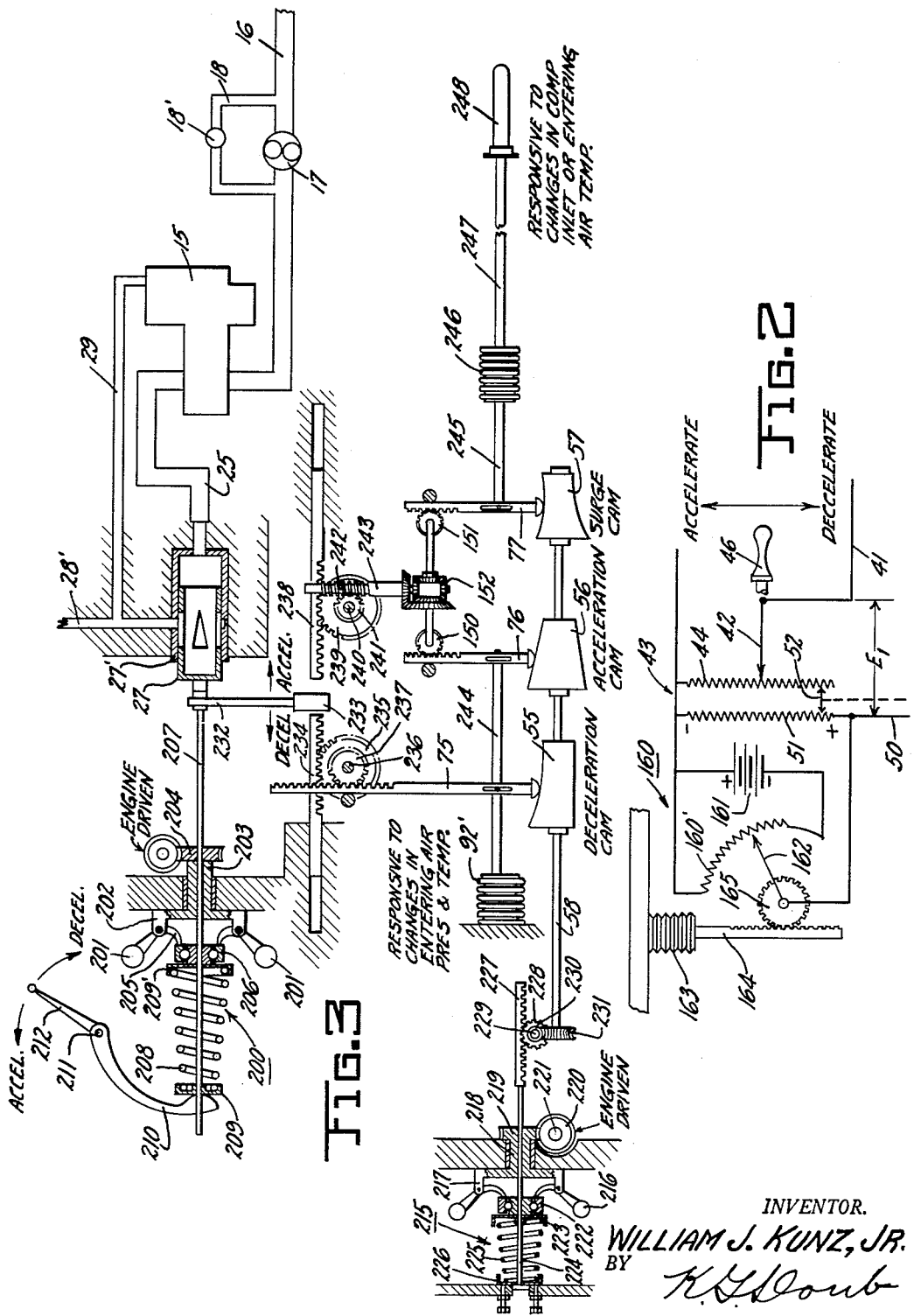

FUEL SCHEDULING CONTROL SYSTEM FOR GAS TURBINE ENGINES

William J. Kunz, Jr., South Bend, Ind., assignor to Bendix Aviation Corporation, South Bend, Ind., a corporation of Delaware Application December 23, 1949, Serial No. 134,715

30 Claims. (Cl. 60—39.28)

This invention relates to a system for regulating the flow of fuel to engines, and particularly gas turbine engines of the type commonly used in aircraft;

The ultimate aim in a control for such engines is one which will permit a pilot or operator to accelerate and decelerate at all altitudes to selected speeds or loads at will with maximum engine efficiency and without hunting or producing dangerously high temperatures, surge or hot blowout on acceleration, or burner die-out upon deceleration; and an object of the present invention is to provide a control which will more nearly attain this aim than prior known controls.

Another and more specific object is to provide a control for gas turbine engines which may be readily adapted to engines having different operating characteristics. For example, in one type of engine, compressor surge may occur at a given engine speed and entering air temperature, while in another type surge may occur at a different speed and temperature, while in still another type the surge problem may be entirely absent. In the control of this invention, the rate of fuel feed is automatically regulated as a function of certain selected parameters which are translated into regulating signals or motion through one or more translating devices calibrated in terms of such parameters for a given increment or range of engine speed, and these devices are intermittently or continuously indexed in relation to engine speed while the engine is in operation; they are what may be aply termed the "heart" of the control and any particular operating characteristic may be obtained by a change in calibration of one or more of said devices without disturbing or without any major change in the remaining parts of the control and which remaining parts may be standardized.

Another object is to provide a control of the type specified which may be more readily tested and calibrated than prior known controls. Thus, its design is such that the control may be located for test at a point more or less remote from the engine being tested and suitable operating connections made electrically; also, the control lends itself to the use of test instrumentation which may be easily read by a pilot while in flight and data taken for resetting and calibrating the control on the ground.

Another object is to provide a control for gas turbine engines which will automatically place a predetermined close upper limit on the rate of fuel feed during acceleration, and a like lower limit on such rate during deceleration, and which at the same time will permit a maximum rate of acceleration and deceleration within such limits.

Another object is to provide a control system for gas turbine engines which will automatically govern the rate of fuel feed within close limits as dictated by prescheduled parameters, such as engine temperature and entering air density, for each increment of engine speed.

A further object is to provide an improved electromechanical control system for gas turbine engines.

In my control system, I utilize a suitable fuel feed or flow regulating valve, an actuator for said valve in the form of a servomotor, and a coacting speed governor system under selective manual control for acceleration and deceleration by a throttle lever or the like. Automatic scheduling or flow regulation is had through one or more primary control elements or translating devices which conveniently may be cams (either contoured mechanical cams or electrical devices having a cam action) and which during acceleration and deceleration are continuously or intermittently indexed in relation to engine speed. These cams are provided with followers which are actuated by the devices for sensing changes in certain parameters which determine limits on the rate of fuel feed, and the followers in turn are automatically connected through suitable signal or motion transmitting means with the speed governor system during acceleration and deceleration of the engine. Each cam has its effective surface calibrated or contoured both as a function of engine speed and certain other known characteristics of the engine for which the control is to be adapted. Thus an engine may have a safe upper temperature limit during acceleration of 1800° to 2000° F., and compressor surge may occur at engine speeds of from 10,000 to 13,000 R. P. M. and entering air temperatures of say 80° to 130° F.; and to avoid burner failure when throttling back, there is usually a lower limit on the rate of fuel feed. Hence, a regulating force or signal is transmitted from the cams to the governor through cam followers which are continually positioned in relation to changes in one or more of said parameters. The cams are the "heart" of the system since their contours determine the effective force or signal to be transmitted to the fuel valve actuator from the primary sensing elements, and the operating relation of the various signals; they are the scheduling means and may be substituted at will while the remaining parts of the control may be standardized for a full line of controls.

The foregoing and other objects and advantages will become apparent in view of the following description taken in conjunction with the drawings, wherein:

Figure 1 is a schematic view of an electromechanical fuel control system for gas turbine engines in accordance with the invention;

Figure 2 is a schematic view of a device for automatically controlling engine speed as a function of altitude and which device is optional equipment for use with the control of Figure 1; and Figure 3 is a similar view of a mechanical means for carrying out the functions of the electrical control of Figure 1.

Referring to the drawings, and first to Figure 1, the burner system of a gas turbine engine is generally indicated at 10; it includes a combustion chamber 11 and burner nozzle 12, to which air is supplied by a compressor 10′ and fuel by way of fuel line 13 and fuel manifold 14. While only one burner unit is shown, it will be understood that any suitable number may be used, each being supplied with fuel from its individual fuel line 13 and the latter taking fuel from the common manifold 14.

Fuel is metered to the manifold 14 by a fuel control device generally indicated at 15. This may be of any suitable type; as shown schematically, it comprises a fuel supply conduit 16 which has mounted therein a pressurizing device such as a fuel pump 17 provided with a by-pass 18 controlled by a valve 18′. The conduit 16 terminates in a regulator valve chamber 19, in which is mounted a regulator valve 20 having its stem connected to a diaphragm 21 backed by spring 22. The diaphragm forms a movable wall between chambers 23 and 23′, and the valve 20 controls ports 24, across which fuel flows to regulator chamber 23 and thence by way of conduit 25 to valve housing 26, having mounted therein a throttle valve 27 provided with a series of metering restrictions 27' and across which fuel flows to the fuel manifold 14 by way of port 28 and conduit 28'. Chamber 23' is vented to metered fuel pressure by passage 29.

The metering valve 27 is rotated to vary the rate of fuel flow; it is connected to a shaft 30 which is driven by means of a servomotor 31 of the two-phase reversing type, provided with field windings 32 and 33.

It will be seen that when the valve 27 is rotated to increase or decrease the effective area of the metering restrictions 27' in registration with port 28, there will be a corresponding increase or decrease in fuel flow which will be proportional to the increase or decrease in area of said restrictions, since the fuel head or differential pressure across said valve will always be maintained at a fixed value over and above metered fuel pressure by an amount determined by the force of spring 22.

The servomotor 31 constitutes the valve actuator of a speed governor system including amplifier 34, converter 35, relay armature 36 forming part of a polarized relay 37, the opposite poles of the latter carrying contact 38, constituting part of a deceleration circuit, and contact 39, constituting part of an acceleration circuit, to be described. The armature 36 is spring-urged to a position intermediate contacts 38 and 39, in which intermediate position it engages automatic governing contact 40, which is connected by wire 41 with the wiper arm 42 of a potentiometer generally indicated at 43 and having a resistance 44 in series with a suitable reference voltage such as a battery 45. The wiper arm is arranged to be actuated by a pilot's control lever 46.

To produce a motive force which varies in relation to changes in engine speed, a tachometer generator 47 is provided and is shown as having a drive shaft 48 adapted to be driven from the engine. The positive terminal 49 of the generator 47 is connected by wire 50 to the circuit wire 41 across the potentiometer 43. The resistance at 51 and double contact or bridging wiper 52 function to maintain a minimum idle flow of fuel at varying altitudes in a manner to be described. The negative terminal of the generator is indicated at 53; it is grounded through wire 53'.

The thermionic amplifier 34 may comprise the conventional multitube unit commonly used to operate electric drive motors of the two-phase reversing type. It should be capable of producing sufficient gain to position the motor drive shaft with the desired degree of accuracy. Obviously, any suitable type of motor or actuator and an amplifier adapted therefor may be used. In the two-phase arrangement, the fixed phase may be shifted nearly ninety electrical degrees with respect to the A. C. supply voltage by a series capacitor (not shown), while the variable phase may be supplied by a saturable reactor so designed that at zero signal input, the voltage applied to the variable phase will be zero and the motor will not run. At negative signal input, however, there will be a voltage applied to the variable phase which will produce rotation of the motor in one direction (here in a valve-opening or acceleration direction), and at positive signal input there will be a voltage applied to the variable phase which will produce rotation of the motor in the opposite or reverse direction (valve-closing or deceleration direction).

The polarized relay 37 is so arranged or has a so-called threshold sensitivity such that when a negative current greater than a certain predetermined all-speed governing value is passed through the relay coil, the armature 36 will be moved against acceleration contact 39; when a positive current also greater than a certain all-speed governing value is passed through the coil, the armature will be moved against deceleration contact 38; and at a plus or minus current within said value, the armature will be spring-urged to a neutral position in engagement with the automatic governing contact 40. When the engine is operating at a steady speed, or when the armature 36 is in the automatic governing position, it is desirable that there be a certain speed range over which such governing may take place. This determines the threshold sensitivity of the armature and may vary for different types of engines and in view of conditions to be encountered. Accordingly, the polarized relay should be adjustable to accommodate such desired range. For example, it may be assumed that the automatic governing range is to be 100 R. P. M., in which event the polarized relay would have a threshold sensitivity of plus or minus one volt. In other words, it would require an E. M. F. of one volt (plus or minus) to move the armature into engagement with either contact 38 or 39. This could be done by adjusting the armature positioning springs.

The voltage output of the generator is directly proportional to rotational and hence engine speed. Simply by way of example, it can be assumed that its maximum speed is 10,000 R. P. M. and that it produces .01 volt per revolution per minute, so that at maximum speed it will be delivering 100 volts and proportionally at any given speed from zero to maximum.

The throttle and coacting governor relay system operates as follows:

Let it be assumed that the pilot has set lever 46 to some intermediate position calling for an engine speed of say 6000 R. P. M. and that the governor is in equilibrium (relay armature 36 in engagement with the contact 40). At this speed, generator 47 will be producing 60 volts, with a polarity as indicated in Figure 1. The throttle controlled wiper arm 42 will be located along the resistance 44 at a point such that there will be a reference voltage of 60 with a polarity as shown. The reference voltage $E_1$ will oppose the generator voltage $E_2$ and the numerical difference or resultant of these voltages will be zero. Since no current will at this time be flowing through the winding of the polarized relay 37, the armature 36 will be spring-urged to its intermediate position in engagement with the automatic governing contact 40. The signal input to the speed governor amplifier 34 will also be zero, and the motor 31 will have rotated the metering valve 25 to a position where the rate of fuel flow produces a speed of 6000 R. P. M. Should the pilot desire to decelerate the engine, he would move the throttle lever 46 in a counterclockwise direction and correspondingly move the wiper arm 42 in a similar direction along the resistance 44. Let it be assumed that the pilot desires to throttle back from 6000 R. P. M. to 2000 R. P. M., then the reference voltage would be 20, but the engine would still be operating at 6000 R. P. M., and hence the generator output would momentarily remain at 60 volts, a difference of 40 volts between $E_1$ and $E_2$. This would cause a positive current to flow through the winding of relay 37, whereupon the armature 36 would move into engagement with the contact 38 and remain so until the engine speed was reduced to 2100 R. P. M. and the output of the generator 47 was reduced to 21 volts. The relay armature 36 would then move back to its steady speed governing position in engagement with contact 40. Should the pilot desire to accelerate from 6000 R. P. M. to a maximum speed of 10,000 R. P. M., then he would move the throttle lever in a clockwise direction until the reference voltage would be 100. The generator, however, would momentarily be operating at a speed such as to produce 60 volts, a difference of 40 volts. This would result in a negative flow of current through the relay 37, whereupon the relay armature 36 would move into engagement with the contact 39 and remain there until the engine attained a speed of approximately 9,900 R. P. M., whereupon the resultant of the voltage $E_2$ and $E_1$ would equal the threshold value of the relay 37, the armature 36 would move back to a neutral position, and the engine would be operating again at a steady governed speed of 10,000 R. P. M.

As heretofore noted, the rate of fuel feed is at all times under automatic control in accordance with certain selected parameters. Thus, on acceleration, there will be an upper temperature limit based on the critical temperatures for which the engine is designed, and in certain engines the rate of fuel feed may require modification at some predetermined point along the acceleration curve to avoid surge and hot blowout. During deceleration there will be a lower limit placed on the rate of fuel feed to avoid flame die-out and consequent burner failure. Assuming that these are the parameters which determine the maximum and minimum rates of fuel feed, then the system may have three signal modifying and transmitting devices which are here shown in the form of cams 55, 56 and 57. These cams are mounted on a common shaft 58 which is rotated or indexed in relation to engine speed. In the example illustrated, the means for rotating or indexing the shaft 58 comprises a motor 60 having field winding 61 and 62. The motor 60 may be of the two-phase reversing type similar to the motor 31 and have an amplifier 63 of substantially the same operating characteristics as the amplifier 34. Rotational movement is transmitted from shaft 58 to the wiper arm 64 of a follow-up potentiometer 65 through gears 66, 66', 67 and shaft 67'. The potentiometer 65 has a resistance 68 in circuit with a reference voltage source 69. The positive terminal of the generator 47 is connected to the signal input side of the amplifier 63 by wire 70, across potentiometer 65, wire 71 and converter 72.

When the engine is running, the generator 47 is producing a predetermined voltage $E_2$ for each increment of engine speed. As heretofore noted, in the example given it is assumed that the engine has a speed range from zero to 10,000 R. P. M., and over this range the generator 47 produces one volt for each 100 R. P. M. The speed position servomotor amplifier 63 receives its signals from the generator 47 ($E_2$). This voltage is opposed by the reference voltage 69, and when the wiper arm 64 of the follow-up potentiometer 65 reaches a point along resistance 68 where the resultant of $E_2$ and $E_3$ equals zero, the signal input to amplifier 63 is zero and motor 60 stops. This condition obtains when the engine is operating at a steady speed. Should the pilot accelerate the engine, there will then be an increase in generator output and the signal input to amplifier 63 will be the difference between $E_3$ and $E_2$ ($E_3-E^2$), whereupon motor 60 will rotate and in turn rotate shaft 58 until wiper arm 64 has adjusted resistance 68 to a point where $E_3-E_2$ equals zero. At a maximum engine speed, wiper arm 64 will have rotated to a point where the full amount of the reference voltage will have opposed the full generator voltage; and at a minimum engine speed, the opposing reference voltage will be at a minimum to correspond to the minimum generator voltage. Upon deceleration, the polarity is reversed and motor 60 rotates in a reverse direction until the resultant of $E_2$ and $E_3$ is zero and at which point the engine is again operating at a given steady speed.

It will thus be seen that for each increment of engine speed, the cams 55, 56 and 57 are repositioned angularly to present a predetermined calibrated contour to the signal transmitting followers, indicated at 75, 76 and 77, which are actuated by the cams; while at the same time the followers are repositioned axially of the cams as a function of the selected engine operating characteristics or parameters which limit or define the rate of fuel feed. In the example illustrated, the acceleration and deceleration followers 75 and 76 are repositioned in relation to changes in entering air density, while the surge follower 77 is repositioned in relation to changes in entering air temperature.

The followers 75 and 76 are interconnected by a bar or rod 78 having its opposite ends shaped to engage in elongated slots 79 and 80 formed in the followers. At its outer free end, the bar 78 is extended in the form of a rack gear 81 in mesh with a gear 82, secured on a shaft 83, driven by a servomotor 84. This servomotor, like the servos 31 and 60, may be of the two-phase reversing type provided with a fixed phase winding 85 and a variable phase winding 86, the latter being energized through a thermionic amplifier 87 and associated converter 88. The amplifier 87, like the amplifiers 34 and 63, may be arranged so that at zero signal input, the voltage applied to the variable phase winding will be zero and the motor will not run, whereas at negative signal input, the voltage applied to the variable phase winding will produce rotation of the motor in one direction, and at positive signal input will produce rotation of the motor in the opposite or reverse direction. The input signal circuit includes an error-input potentiometer 89 having a resistance 90 and a suitable reference potential in the form of a battery 91. A capsule or bellows 92 is located at a point where it will be subjected to air intake or ram pressure and is provided with a connection 93 at its movable end which actuates a wiper arm 94 along the resistance 90. The resistance 90 is connected to the converter 88 and thence to the input side of amplifier 87 by wire 95.

A follow-up or feedback potentiometer is indicated at 96; it is provided with a suitable resistance 97 and a reference voltage source shown in the form of a battery 98. A wiper arm 99 coacts with the resistance 97; it is connected for rotational movement in relation to the motor-driven shaft 83 by means of gear 100 and a suitable drive connection indicated by the dotted line 101. Wire 102 connects wiper arm 99 with the converter 88 and thence to the input side of the amplifier 87, and wire 103 connects the feedback potentiometer 96 with the error potentiometer through wiper arm 94.

Bellows 92 is responsive to changes in entering air density; that is, it is loaded to respond to changes in pressure and temperature and therefore density. As illustrated, it will elongate as density decreases, or as altitude is gained, and move the wiper arm 94 downwardly along the resistance 90. The potentiometers 89 and 96 are connected in opposition; and at sea level (assuming a normal sea level temperature condition), the voltages $E_4$ and $E_5$ will be equal and in opposition and the flow of current through the variable phase winding 86 will then be zero. As altitude is gained and density decreases, the wiper arm 94 will vary the resistance 90 and the resultant of $E_4$ and $E_5$ will cause current to flow in the amplifier and winding 86 of a polarity such as to produce rotation of the motor 84 in a direction to move the followers 75 and 76 to the left. Rotation of motor 84 will move the follow-up wiper arm 99 along feedback resistance 97, and at constant density when the bellows 92 holds the wiper arm 94 at a fixed position, the resultant of $E_4$ and $E_5$ will again become zero and the motor 84 will stop. Obviously, an increase in density as by a decrease in altitude will cause the bellows 92 to collapse and there will again be a difference between $E_4$ and $E_5$, but of opposite polarity, causing rotation of the motor 84 in a direction to move the followers 75 and 76 to the right along the cams 55 and 56.

The surge cam follower 77 has connected thereto a rack bar 106 which has its one end shaped to engage in an elongated slot 107 formed in said follower, and at its opposite extremity carries a rack gear 108 in mesh with a gear 109, mounted on a shaft 110, driven by a servomotor 111 and which, like the servomotors 31, 60 and 84, is shown as being of the two-phase reversing type provided with a fixed phase winding 112 and a variable phase winding 113. The variable phase winding is energized at signal input other than zero through an amplifier 114, whose signal input circuit is sensitive to changes in temperature. Any suitable type of temperature sensing arrangement may be adopted; that here illustrated being of the reference junction type. A thermocouple 115 is located at a point where it will be subjected to temperatures affecting surge, for example compressor inlet temperatures. The thermocouple has its opposite terminals connected into a reference junction 115'. The one terminal of the reference junction is connected by wire 116 with the input to the amplifier 114 through a converter 117, while the opposite terminal of the reference junction is connected by wire 118 with a follow-up wiper arm 119 movable along the resistance 120 of a feedback potentiometer 121, provided with a voltage source in the form of a battery 122. The wiper arm 119 is mechanically connected to the shaft 110 for positioning relatively thereto by means of gear 123 and driving member or shaft shown in dotted lines at 124. The resistance 120 is tapped at 125 and connected by wire 126 with the input side of the amplifier 114 through converter 117. The reference voltage is maintained at a constant temperature by any suitable means well known in the art, and the point at which the resistance 120 is tapped is determined in the light of the set temperature of the reference junction. If the temperature sensed by the thermocouple 115 corresponds to that of the junction 115', the voltages $E_6$ and $E_7$ will be equal and opposite and no current will flow in the amplifier and the variable phase coil 113. However, should the temperature sensed by the thermocouple 115 be above or below that of the reference junction, there will be a plus or minus difference between $E_6$ and $E_7$, whereupon current will flow through the winding 113 and produce rotation of the motor 111. If the temperature sensed by the thermocouple 115 is below that of the reference junction, the polarity of the voltage will be such as to produce rotation of motor 111 in a direction to move the follower 77 to the right along the cam 57; whereas should the temperature rise above such predetermined value, reverse rotation will take place since the voltage will then be of opposite polarity. At a condition of constant temperature, the follow-up wiper arm 119 will come to rest at a point along resistance 120 where the resultant of the voltages $E_6$ and $E_7$ will again become zero and servomotor 111 will stop.

The deceleration circuit, viz. the circuit which governs the signal input to the speed governing servo 31 when the relay armature 36 is in engagement with contact 38, is energized from a suitable source of potential illustrated as a battery 130 which on its positive side connects across error input potentiometer resistance 131, wiper arm 132 and wire 133 with contact 38, and on its negative side connects by wires 134 and 135 with the negative side of a feed back potentiometer 136 having a resistance 137. A wiper arm 138 is adjustable along the resistance 137 in relation to the angular position of shaft 30, said arm having a driving connection with said shaft by means of gears 139, 140 and shaft 141. Arm 138 is connected to the ground through circuit wire 142.

The acceleration circuit, viz. the circuit which governs the signal input to the speed governing servo 31 when the relay armature 36 is in engagement with the contact 39, is energized from a suitable source of potential illustrated as a battery 145, which on its positive side connects across error input potentiometer resistance 146, wiper arm 147 and wire 148 with contact 39, and on its negative side connects by wires 149 and 135 with the negative side of feedback potentiometer 136.

The wiper arm 132 is connected to the deceleration follower 75 and hence is positioned in relation to (a) engine speed and (b) the density of the air flowing to the engine, whereas the wiper arm 147 is positioned in relation to (a) engine speed, (b) the density of the air flowing to the engine, and (c) a condition affecting surge such as compressor inlet temperature. Accordingly, the acceleration follower 76 and the surge follower 77 are connected through gears 150, 151 and differential 152 with a shaft 153 adapted to impart rotational or angular movement to the said wiper arm 147.

The manner in which the respective followers 75, 76 and 77 are arranged to vary the potentiometer resistances through wiper arms 132 and 147 is preferably such that the voltages $E_9$ and $E_{10}$ will be varied in proportion to follower movement as produced by the contoured cams 55, 56 and 57.

When the relay armature 36 engages the deceleration contact 38, there will be a signal input voltage $E_9$ of a polarity such as to cause rotation of motor 31 in a direction to close metering valve 27. The particular location of wiper arm 132 with respect to potentiometer resistance 131 when the pilot first throttles back will depend on the then existing speed position of cam 55 and follower 75. If at the time the pilot throttles back engine speed is at a maximum at a high altitude, wiper arm 132 may be at its highest vertical position along resistance 131 as viewed in Figure 1. The initial action is rotation of motor 31 and metering valve 27 in a fuel decreasing direction, which slows down the engine, whereupon the wiper arm 138 follows up to decrease the error or difference between $E_8$ and $E_9$. For each increment of decrease in the signal input $E_9$, there will be a corresponding increment of closing movement of valve 27 and adjustment of the feedback voltage $E_8$. By properly calibrating cam 55 and coordinating or adjusting potentiometers 131 and 137, any desired rate in the decrease of fuel feed may be obtained.

When the relay armature 36 engages the acceleration contact 39, there will be a signal input voltage $E_{10}$ of a polarity such as to cause rotation of motor 31 in a direction to open metering valve 27. If at the start of acceleration the engine is running at an idle speed and operation is at ground level or low altitude, the wiper arm 147 may be close to the negative end of the potentiometer ressitance 146. The signal input voltage $E_{10}$ will produce rotation of motor 31 in a direction to open valve 27 and increase the rate of fuel feed. As the engine speeds up, wiper arm 147 moves toward the positive end of resistance 146 and $E_{10}$ increases, while at the same time feedback or follow-up wiper arm 138 also moves toward the positive end of resistance 137. For each increment of increase in the signal input $E_{10}$, there will be a corresponding increment of opening movement of metering valve 27 and adjustment of the feedback voltage $E_8$. By properly calibrating cam 56 and coordinating potentiometers 146 and 137, the desired rate of increase in fuel feed during acceleration may be obtained. During acceleration, the wiper arm 147 will also be under control of the surge cam 57 acting through follower 77, gear 151 and differential 152. When the control is on the accelerating or decelerating contact, the fuel valve is under positional control of the acceleration and deceleration cams, which together with their coacting servos constitute, in effect, adjustable limit stops, the adjustment of which is determined by the cam contour and which in turn is determined by the respective control parameters.

*General description of operation, Figure 1*

The metering valve 27 will meter fuel in direct relation to the area of the graduated metering orifices 27' exposed to the metered fuel outlet 28, since the head across the valve is maintained substantially constant by the regulator valve 20 and its spring backed diaphragm 21.

In the position of the parts as shown in Figure 1, the speed governing servo 31 and control relay 37 are in constant or steady speed governing position, the relay armature 36 being in engagement with contact 40. Under these conditions, the signal input to the amplifier 34 tends toward zero with the generator voltage $E_2$ equal and opposite to the throttle set potentiometer voltage $E_1$. It may be assumed that the engine has a speed range of 10,000 R. P. M. and is operating at some nominal speed, for example 6000 R. P. M., the engine driven generator 49 is producing 60 volts, and the throttle controlled wiper arm 42 has been set at a point along resistance 44 where $E_1$ will be 60 volts of a polarity opposite that of $E_2$. Since the numerical difference of these voltages is then zero, no current will flow in the coil of the polarized relay 37 and the relay armature 36 will remain in engagement with contact 40. As heretofore noted, the relay armature is preferably set or adjusted for a threshold sensitivity which will provide the desired steady speed governing range, for example, plus or minus one volt (100 R. P. M.) before actual shifting to the scheduled acceleration or deceleration circuit takes place. If for some reason such as altitude, wind velocity, etc. the engine load varied sufficiently to cause an increase of 10 R. P. M., the speed governing servo would operate in a valve closing direction until the rate of fuel feed resulted in a speed of 6000 R. P. M. Thus at 6010 R. P. M., the generator 47 will produce 60.1 volts ($E_2$) whereas $E_1$ remains at the throttle setting of 60 volts. The difference between $E_2$ and $E_1$ is therefore plus .1 volt. The polarized relay armature 36 will therefore remain in its governing position. However, there will be a positive input signal of .1 volt to the amplifier 34, which will produce sufficient power to operate the motor 31 in a direction to close the fuel valve until the rate of fuel feed produces an engine speed of 6000 R. P. M. When the engine speed returns to the original setting of 6000 R. P. M., $E_1$ and $E_2$ again balance, signal input becomes zero, and the fuel valve 27 remains in a fixed position.

While the engine is operating, the acceleration and deceleration limits on the rate of fuel feed are being continually revised due to indexing of the cams 55, 56 and 57 in relation to engine and repositioning of the followers 75, 76 and 77 as a function of altitude or changes in entering air pressure and temperature so that at any instant that the pilot may set his lever to accelerate or decelerate the engine, a predetermined schedule of fuel feed will result.

The double contact wiper arm 52, which is electrically connected across resistances 51 and 44 and mechanically connected to the altitude servo shaft 53, functions to constantly revise the minimum idle fuel limits in relation to altitude. Thus, as altitude is gained, the servomotor shaft 83 will rotate in a direction to move the wiper arm 52 upwardly along resistances 51 and 44 as viewed in Figure 1. The position of the wiper arm 52 determines the minimum effective setting electrically of the wiper arm 42, since the latter will become ineffective or will be cut out of circuit when it is moved below the adjacent contact of the wiper arm 52. Upon a decrease in altitude, shaft 83 reverses and moves minimum idle wiper arm 52 downwardly to increase the minimum idle flow.

Assuming the pilot desires to accelerate from idle speed to a maximum engine speed, then he will move the control lever 36 in a direction to move the wiper arm 42 upwardly or from plus to minus along the resistance 44. This increases $E_1$; the engine, however, will at that instant be operating at idling speed and the voltage $E_2$ will be at a relatively low value. The difference between $E_1$ and $E_2$ will immediately produce a signal input voltage of a polarity such as to cause the relay 37 to move the relay armature 36 upwardly into engagement with contact 39. The acceleration circuit now takes over, and there will be a signal input $E_{10}$ to the speed governing amplifier 34 by way of circuit wire 148 and, relay armature 36. The polarity of this signal voltage will be in a direction to cause servomotor 31 to rotate shaft 30 in a direction to open the metering valve 27, the upper limit on the rate of fuel feed being determined by the contour of the acceleration cam 56 and the surge cam 57, which act through the followers 76 and 77, gears 150 and 151 and differential 152 to adjust the wiper arm 147 along resistance 146.

If it be assumed that the engine being governed has a surge characteristic such that surge occurs during acceleration at a compressor inlet temperature of say 80° F. and an engine of between 7000 and 10,000 R. P. M., then the temperature responsive circuit originating at the thermocouple 115 and junction box 115' will produce rotation of motor 111 in a direction to properly locate surge follower 71 along cam 57 and modify the rate of fuel feed as a function of engine speed and compressor inlet temperature, the two factors which are known to influence a surge condition.

When the engine attains the selected speed, the resultant of voltages $E_1$ and $E_2$ becomes zero and the relay armature 36 then swings back to its neutral position in engagement with the contact 40, whereupon automatic governing is resumed at a steady speed. The action of the amplifier 63 and its interrelated error input and feedback circuit, including potentiometer resistance 68 and wiper arm 64, is such as to reduce the numerical difference or voltage relation between $E_3$ and $E_2$ to zero, whereupon the servomotor 60 stops at some definite position with relation to $E_2$. Thus the angular position of cam shaft 58 is always proportional to the speed of rotation which creates $E_2$, and each of the cams 55, 56 and 57 are rotated a predetermined number of degrees for a given R. P. M.

Should the pilot desire to decelerate the engine, he moves the lever 46 and wiper arm 42 downwardly along resistance 44, whereupon there will be a reduction in $E_1$ while $E_2$ will momentarily remain at a higher value due to the then existing engine speed. Current will now flow through the coil of relay 37 of a polarity such as to cause the relay armature 36 to engage deceleration contact 38. The deceleration cam 55 and the altitude compensating circuit, including error input potentiometer 89 and feedback potentiometer 96, will then take over and act through the follower 75 and potentiometer resistance 131 to determine the minimum rate of feed of deceleration fuel to avoid burner blowout. The initial action is a signal input $E_9$ to the amplifier 34 by way of wire 133 and 41' of a polarity such as will cause the servomotor 31 to rotate valve 27 in a fuel decreasing direction, the rate at which the valve closes being basically determined by the contour of cam 55 and the altitude or density control circuit which governs the position of follower 75 linearly of said cam. As shown in Figure 1, the cam 55 is contoured to move the follower 75 upwardly during deceleration and downwardly during acceleration, the rate of such movement being modified as a function of entering air density.

When the engine speed is reduced to the point selected by the setting of the pilot's control lever, the resultant of voltages $E_1$ and $E_2$ again drops below the threshold value and the relay armature 36 swings back to its steady speed governing position in engagement with contact 40.

While no starting mechanism has been shown, it will be understood that any suitable equipment adapted for this purpose may be used. One of the advantages of the system herein disclosed is the ability to govern and schedule fuel metering from zero to maximum engine speeds, so that no special fuel control or regulating mechanism is needed for starting. If desired, a starting motor may be interconnected with the pilot's control through a relay arranged to kick out when the engine starts to operate under its own power. Beyond this, no extra starting equipment would ordinarily be required since the starting fuel schedule may be incorporated on the accelerator cam 55.

In order to maintain stability in the various servo systems, suitable damping devices such for example as rate generators may be required. Such conventional apparatus has not been shown or described, since it falls within known and accepted practice and would simply complicate the disclosure and detract from the essentials of the invention.

*Figure 2*

Figure 2 illustrates an arrangement for automatically controlling engine speed as a function of altitude. Instead of the throttle battery 45 of Figure 1, the output of an altitude potentiometer 160 is substituted. It has a resistance 160' and reference voltage in the form of a battery 161 connected across the resistance. A wiper arm 162 is connected to a density responsive capsule or bellows 163 by means of rack 164 and gear 165.

As altitude is gained, bellows 163 expands and adjusts wiper arm 162 along resistance 160', and assuming the throttle to be at a constant speed setting with the relay armature 36 in engagement with contact 40, then $E_1$ would vary in relation to such adjustment. Hence a difference between $E_1$ and $E_2$ would result with each change in altitude which would produce an input signal to amplifier 34 tending to operate the motor 31 in a valve closing direction; a decrease in altitude having the opposite effect.

*Figure 3*

In Figure 3, there is illustrated schematically a mechanical apparatus for carrying out the functions of the combined electrical and mechanical device of Figure 1. The fuel regulator is generally similar to that shown in Figure 1, and like parts thereof in Figure 3 are given corresponding reference numerals. The metering valve 27 is positioned axially by an engine driven governor generally indicated at 200; it includes fly-weights 201, pivotally mounted on a bracket 202, carried by a shaft 203, provided with a drive pinion 204 adapted to be driven from the engine. Each of the fly-weights carries a finger 205, adapted to engage the outer race of a bearing 206 for a spindle 207 on which is assembled a governor spring 208 and front and rear retainer plates 209 and 209'. The plate 209 is engaged by the free end of a lever 210, the opposite end of which is secured on a shaft 211, adapted to be rotated by a pilot's control lever 212.

The governor spindle 207 has secured on the free end thereof a metering valve which is substantially similar to the corresponding valve 27 of Figure 1 and is provided with metering orifices 27' contoured to obtain a predetermined rate of flow for each increment of linear travel.

The deceleration, acceleration and surge cams and their coacting followers may be of the same general type as in Figure 1 and are given similar reference numerals. The governor for angularly positioning or resetting these cams for each increment of engine speed is generally indicated at 215; it includes centrifugal or fly-weights 216, pivotally mounted on a bracket 217, carried by shaft 218, provided with a gear 219, in mesh with a worm 220, secured on an engine driven shaft 221. The weights 216 are provided with fingers which engage the outer race of a bearing 222, the inner race of which bears against a thrust or backing plate 223 and is secured on a shaft 224, encircled by a preloaded governor spring 225, adjustably anchored by backing plate 226.

At its free end the governor actuated shaft 224 is provided with a rack 227, which is in mesh with a gear 228, secured on a jack shaft 229, the latter also having secured thereon a worm 230 in mesh with a worm gear 231, secured on cam shaft 58. It will thus be seen that rectilinear movement imparted to the rack 227 through the action of governor 215 is converted into rotary or angular movement and applied in resetting the cams 55, 56 and 57 in relation to engine speed.

The throttle valve shaft 207 has secured thereon a bracket 232 which carries a contact member 233. On one side of the contact 233 is a deceleration limiting member 234, which is illustrated in the form of a slidably mounted rack bar having its teeth in mesh with a gear 235, secured on a jack shaft 236, the latter also having secured thereon a gear 237 in mesh with the toothed or rack portion of the follower 75.

On the other side of the contact member 233 is an acceleration limiting member 238, which is also illustrated in the form of a slidably mounted rack bar having its teeth in mesh with a gear 239 secured on a jack shaft 240, the latter also having fixed thereon a worm gear 241, in mesh with a worm 242, secured on a shaft 243. The shaft 243 is rotated through movement of cam followers 76 and 77, which find their counterpart in Figure 1, and act in the same manner to transmit motion to said shaft through gears 150, 151 and differential 152. The followers 75 and 76 are interconnected by a bar or rod 244 which at its outer or left end is connected to the movable end of a capsule or bellows 92', which functions in the same manner as the bellows 92 of Figure 1; it is responsive to changes in entering air pressure and temperature and is located at a point where it will be subjected to air intake or ram pressure. The follower 77 has connected thereto a rod or bar 245 which at its right-hand end is connected to the movable end of a bellows or capsule 246, the interior of the latter communicating through tube 247 with a thermal element or bulb 248. The bellows 246, tube 247 and bulb 248 may be loaded with a suitable fluid responsive to changes in temperature, and the bulb 248 is located at a point where it will be subjected to compressor inlet or entering air temperature.

*Operation, Figure 3*

Since the head across the metering valve 27 is maintained substantially constant by the regulator 15 in the same manner as in Figure 1, the said valve 27 will meter fuel in direct relation to the area of the graduated metering orifices 27'.

In the position of the parts as shown in Figure 3, it can be assumed that the governor 200 is in equilibrium and that the engine is operating at a steady speed of, say, 6000 R. P. M. at a given altitude and entering air temperature. Under these conditions, the deceleration, acceleration and surge cams would be spotted at a definite angular position, and the members 234 and 238 would be so located with respect to the member 233 as to permit only a limited range of deviation of the rate of fuel flow from a predetermined scheduled value. If now the pilot should wish to accelerate, he would move the lever 212 in a counterclockwise direction, compressing the governor spring 208 and simultaneously moving the valve 27 in a direction to increase the rate of fuel feed. The amount of movement of the valve 27 in a speed increasing direction is limited by the member 238, until such time as the increased engine speed repositions the cam 56 and causes the said member 238 to move to the right, whereupon the metering valve 27 also moves to the right to gradually increase the rate of fuel feed in relation to engine speed. The rate of increase (or the rate of movement of the member 238), is also governed as a function of surge due to the action of the surge cam 57. When the engine attains the selected speed, the governor weights 201 balance the governor spring in the new spring setting, and the engine is again operating in equilibrium, with the cams 55, 56 and 57 spotted or located at a given angular position with relation to the new or selected engine speed.

To decelerate, the pilot moves the lever 212 in a clockwise direction, thereby decreasing the force exerted by the governor spring 208 on the rotating governor weights 201, and metering valve 27 will move to the left, but only so far as and at a rate determined by the member 234, whose position and rate of movement is in turn determined by the deceleration cam 55.

While the engine is operating, the acceleration and deceleration limits on the rate of fuel feed are being continually revised as a function of altitude or changes in entering air pressure and temperature due to the action of the capsule or bellows 92', and also as a function of surge by the action of the temperature responsive bellows 246.

The cams 55, 56 and 57 are contoured to permit maximum acceleration without producing dangerously high burner temperatures, surge or hot blowout, while the deceleration cam is contoured to limit the rate of deceleration to prevent burner die-out.

In both forms of the invention illustrated, during acceleration and deceleration there are definite upper and lower limits placed on the rate of fuel feed irrespective of how suddenly the pilot may move his control lever to different selected operating positions. In Figure 3, these limits are set by the members 234 and 238, which constantly move with the valve 27 as the latter is adjusted to its different flow regulating positions. In both forms of the invention, the limiting means on the rate of fuel feed are always in correct position and are being constantly reset on practically an instantaneous basis in relation to changes in the selected parameters.

Another feature to be emphasized is that there are no small bleeds or ducts through which the fuel must flow other than the metering orifices of the valve 27. This permits the use of fuels having a certain amount of dirt and other foreign matter therein as well as fuels of widely different grades. Also, the acceleration and deceleration controls are, in effect, separate and independent of one another and one may be calibrated or adjusted independently of the other and without affecting other parts of the control.

Although only two embodiments of the invention have been illustrated and described in schematic form, it will be understood that certain changes in the form and relative arrangement of the parts may be necessary to suit requirements, such changes and modifications being obvious to those skilled in the art.

I claim:

1. In a fuel control system for a gas turbine engine having a burner and means for varying the rate of fuel flow to said burner, means for actuating said varying means, separate acceleration and deceleration devices calibrated as a function of engine speed plus additional engine operating parameters, a surge device calibrated as a function of engine speed and entering air temperature, means for indexing or resetting said devices in relation to engine speed throughout the acceleration and deceleration ranges of the engine, means for converting changes in said engine operating parameters to a regulating force through said devices, and means for utilizing such force to control said actuating means.

2. In a fuel control system for a gas turbine engine having a burner and means for varying the rate of fuel feed to said burner, means for actuating said varying means, and separate acceleration, compressor surge, and deceleration means for controlling said actuating means including a motion transmitting device calibrated in terms of engine speed plus other engine operating parameters, means for indexing or resetting said device in relation to engine speed throughout the acceleration and deceleration ranges of the engine, means for transmitting a regulating force to said actuating means from said device, and means for modifying said force in relation to changes in said engine operating parameters.

3. In a fuel control system for a gas turbine engine having a burner and means for varying the rate of fuel flow to said burner, means for actuating said varying means, a pair of primary control devices responsive to changes in engine speed, gas pressure, and inlet air temperature one of said devices functioning to determine the upper limit on the rate of fuel feed during acceleration and the other functioning to determine the lower limit on the rate of fuel feed during deceleration of the engine, means for indexing or resetting said devices in relation to engine speed throughout the acceleration and deceleration ranges, means for transmitting a regulating force from said devices to said actuating means, and means for modifying said force in relation to changes in gas pressure and temperature.

4. A fuel control system as claimed in claim 3 wherein said actuating means has operatively associated therewith a governor and a control therefor adjustable to select the operating speeds of the engine, said governor functioning to control said actuating means at steady speeds, and means are provided for automatically disconnecting the governor from said actuating means and connecting the latter with either the acceleration device or deceleration device when said control is adjusted to accelerate or decelerate the engine and for again connecting said actuating means with the steady speed governor when the selected speed is attained.

5. In a fuel control system for a gas turbine engine having a burner, a turbine driven compressor and means for varying the rate of fuel flow to said burner; means for actuating said varying means, a plurality of primary control devices, one for controlling said actuating means during acceleration of the engine, another for controlling said actuating means during deceleration, and another for modifying the rate of fuel feed during acceleration to avoid a surge condition, said acceleration and deceleration devices being calibrated as a function of engine speed plus entering air density and said surge device being calibrated as a function of engine speed plus compressor air inlet temperature, means for resetting or indexing said devices in relation to engine speed throughout the acceleration and deceleration ranges, means for transmitting a regulating force from said devices to said actuating means, and means for modifying said force in relation to changes in entering air density and compressor inlet temperature.

6. In a fuel control system for a gas turbine engine having a burner, a turbine driven compressor and means for varying the rate of fuel flow to said burner; means for actuating said varying means, a plurality of primary control devices, one for generating a regulating force to control said actuating means during acceleration of the engine, another for generating a like force to control said actuating means during deceleration and another for modifying the regulating force produced during acceleration to avoid a surge condition, said acceleration and deceleration devices being calibrated as a function of engine speed and entering air density and said surge device being calibrated as a function of engine speed and compressor air inlet temperature, means operatively connecting said devices with the engine for resetting or indexing said devices in relation to engine speed over the acceleration and deceleration range, means responsive to changes in entering air density, means responsive to compressor inlet temperature, and means operatively connecting said density responsive means and temperature responsive means with said devices for modifying said regulating forces in relation to changes in entering air density and compressor inlet temperature.

7. In a fuel control system for a gas turbine engine having a burner, a turbine driven compressor and means for varying the rate of fuel flow to said burner; means for actuating said varying means, a plurality of primary control cams for generating a regulating force to control said actuating means during acceleration and deceleration of the engine, said acceleration and deceleration cams being contoured as a function of engine speed and entering air density, means for moving said cams during the acceleration and deceleration range to present a specially contoured cam surface for such increment of engine speed, followers for said cams, means responsive to changes in entering air density arranged to reposition said followers on said cams, and means for transmitting a regulating force from said followers to said actuating means.

8. A fuel control system as claimed in claim 7 wherein there is an additional cam for avoiding a surge condition during acceleration, said surge cam being contoured as a function of engine speed and compressor inlet temperature and having a follower which is repositioned in response to changes in such temperature and modifies the regulating force generated by the acceleration cam.

9. In a fuel control system for a gas turbine engine having a burner and means for varying the rate of fuel feed to said burner, a power actuator for said varying means, a speed governing device for controlling said actuator, a first means for controlling said device for operation at steady engine speeds, a second means for controlling said device during acceleration of the engine and a third means for controlling said device during deceleration of the engine, a governor control element movable to different positions to select operational engine speeds, and means arranged to maintain said first control means operatively connected with said governing device when the engine is running at a steady speed and to automatically override said first-named control means with either said second or third control means when said element is moved to increase or decrease the speed of the engine.

10. A fuel control system as claimed in claim 9 wherein said first control means includes a mechanism for maintaining said first control means effective during engine speed fluctuations within established limits.

11. In a fuel system for an aircraft engine, the combination with a valve mechanism, of means for actuating the same comprising means for establishing a reference signal corresponding to a desired engine speed, means for producing a signal representing actual engine speed, means for combining said signals and converting the resultant into a valve actuating force, means for sensing said signal due to actual engine speed including a device positionable in accordance with said engine speed, means for producing a signal representing altitude conditions including a device operatively connected to said first named device, and means interconnected with said devices and said valve for creating a signal which is converted into a valve actuating force for modifying said valve position established by the first mentioned valve actuating force.

12. In a fuel control system for a gas turbine engine having a burner and means for varying the rate of fuel feed to said burner, an actuator for said varying means in the form of an electric servomotor, an electric speed governing device for controlling said servomotor, a steady speed governing electric circuit for conducting current to said device during operation of the engine at steady speeds, an acceleration circuit for conducting current to said device during acceleration of the engine and a deceleration circuit for conducting current to said device during deceleration of the engine, means for energizing said circuits, a manual control element movable to different positions to vary the resistance of said first circuit to select engine operational speeds, and electric switch means arranged to maintain said steady speed circuit connected with said governing device when the engine is running at a steady speed and to automatically disconnect said steady speed circuit from said device and connect either said acceleration or deceleration circuits to said device when said element is moved to increase or decrease the speed of the engine.

13. A fuel control system as claimed in claim 12 wherein said switch means comprises a polarized relay and relay armature and said steady speed governing circuit incorporates means for reversing the polarity of the relay when said control element is moved from a steady speed position to an accelerating or decelerating position, said armature reverting to a steady speed governing position when the current flow decreases to a predetermined minus or plus value.

14. In a fuel control system for a gas turbine engine having a burner and means for varying the rate of fuel feed to said burner; an actuator for said varying means in the form of an electric servomotor, an electric speed governing device for controlling said motor, a steady speed governing circuit adapted to be connected to said device, means for impressing a signal on said circuit varying in relation to variations in engine speed, means in said circuit for producing a reference signal in opposition to said first-named signal, a power control element movable to different positions to accelerate and decelerate the engine and simultaneously adjust the reference signal, the resultant signal being impressed on said speed governing device to control said servomotor.

15. A fuel control system as claimed in claim 14 wherein means is provided for automatically limiting the deceleration signal as a function of the density of the air flowing to the engine, to thereby adjust the minimum idle speed of the engine in relation to changes in altitude.

16. In a fuel control system for a gas turbine engine having a burner and means for varying the rate of fuel feed to said burner; an actuator for said varying means in the form of an electric servomotor, an electric speed governing device for controlling said motor, a steady speed governing circuit, an acceleration circuit and a deceleration circuit, means for selectively connecting said device with any one of said circuits, means in said circuits for producing signals to be impressed on said control device, a power control element adjustable to different positions to vary the polarity and magnitude of the input signal, and means for automatically limiting the magnitude of the deceleration signal as a function of the density of the air flowing to the engine.

17. In a fuel control system for a gas turbine engine having a burner and means for varying the rate of fuel feed to said burner; an actuator for said varying means in the form of an electric servo-motor, an electric speed governing device for controlling said motor, a steady speed governing circuit, an acceleration circuit and a deceleration circuit, signal producing means for said circuits, means for selectively connecting said speed governing device with any one of said circuits, and primary acceleration and deceleration control devices for adjusting the signal producing means of the acceleration and deceleration circuits as a function of engine speed and the pressure and temperature of the air flowing to the engine.

18. In a fuel control system for a gas turbine engine having a burner and means for varying the rate of fuel feed to said burner; an actuator for said varying means in the form of an electric servomotor, an electric speed governing device for controlling said servomotor, a steady speed governing circuit, an acceleration circuit and a deceleration circuit, means in said circuits for producing signals to be impressed on said speed governing device, means for selectively connecting said speed governing device with said circuits, primary acceleration and deceleration control devices for adjusting the signal producing means of the acceleration and deceleration circuits, and means for resetting or indexing said acceleration and deceleration devices in relation to engine speed.

19. In a fuel control system for a gas turbine engine having a burner and means for varying the rate of fuel feed to said burner; an actuator for said varying means in the form of an electric servomotor, an electronic speed governing device for controlling said servomotor, a steady speed governing circuit, an acceleration circuit and a deceleration circuit, means in said circuits for producing signals to be impressed on said speed governing device, means for selectively connecting said device with said circuits, primary acceleration and deceleration control devices for adjusting the signal producing means of the acceleration and deceleration circuits, means for resetting or indexing said acceleration and deceleration control devices in relation to engine speed, said latter means including an electric servomotor and a control device therefor, and means for impressing a signal on said latter control device varying in relation to variations in engine speed.

20. In a fuel control system for a gas turbine engine having a burner and means for varying the rate of fuel feed to said burner; an actuator for said varying means in the form of an electric servomotor, an electronic speed governing device for controlling said servomotor, a steady speed governing circuit, an acceleration circuit and a deceleration circuit, signal producing means for said circuits, means for selectively connecting said circuits with said device, primary acceleration and deceleration control devices for adjusting the signal producing means of the acceleration and deceleration circuits, means for resetting or indexing said acceleration and deceleration control devices in relation to engine speed, and means for modifying the signal adjustment of said acceleration and deceleration control devices in relation to changes in the pressure and temperature of the air flowing to the engine.

21. In a fuel control system for a gas turbine engine having a burner and means for varying the rate of fuel feed to said burner; an actuator for said varying means in the form of an electric servomotor, an electronic speed governing device for controlling said servomotor, a steady speed governing circuit, an acceleration circuit and a deceleration circuit, signal producing means for said circuits, means for selectively connecting said device with said circuits, primary acceleration and deceleration control cams and coacting cam followers for adjusting the signal producing means of the acceleration and deceleration circuits, means for angularly resetting said cams over the acceleration and deceleration range of the engine, and means responsive to changes in entering air density for adjusting the cam followers with respect to their cams.

22. A fuel control system as claimed in claim 21 wherein there is an additional primary control device in the form of a surge cam and coacting follower for modifying the signal adjustment of the acceleration cam, and means are provided for adjusting the follower of the surge cam in relation to changes in compressor inlet temperature.

23. In a fuel control system for a gas turbine engine having a burner and means for varying the rate of fuel feed to said burner; an actuator for said varying means in the form of a reversible electric servomotor, an electronic speed governing device for controlling said servomotor, a steady speed governing circuit, an acceleration circuit and a deceleration circuit, signal producing means for said circuits, means for selectively connecting said device with said circuits, primary acceleration and deceleration control cams and cam followers for adjusting the signal producing means of the acceleration and deceleration circuits, an electric servomotor for angularly resetting or indexing said cams, an electronic control device for said latter servomotor, means for impressing a signal on said latter control device varying with variations in engine speed, and means responsive to changes in the pressure and temperature of the air flowing to the engine for adjusting said cam followers.

24. In a fuel control system for an engine, a fuel metering valve member movable to different positions to vary the rate of fuel flow in relation to travel of said valve member, an adjustable all speed governor operatively connected to said valve member for effecting movement of the latter, means for adjusting said governor to select an operating speed for the engine, and stop means movable through different flow regulating positions effective to limit the travel of said valve member to a metering rate conforming to a predetermined engine acceleration schedule.

25. A fuel control system as claimed in claim 24 wherein means are provided for controlling the rate of movement of said limiting means as a function of engine speed plus an additional engine operating parameter.

26. In a fuel control system as claimed in claim 24 wherein said movable limiting means comprises an acceleration stop member and a deceleration stop member, and means are provided for positioning said members as a function of an engine operating parameter.

27. In a fuel control system for a gas turbine engine having an air compressor, a fuel valve adapted to vary the rate of fuel flow in relation to valve travel, an adjustable all-speed governor arranged to control said valve, a pilot's control lever for adjusting said governor to select an operating speed for the engine, a limiting member adapted to control the rate of movement of said valve when accelerating the engine irrespective of how suddenly the pilot's control lever may be reset to a selected position, and means for automatically controlling said limiting member as a function of engine speed modified by compressor inlet pressure and temperature during transition in speed following resetting of said lever.

28. In a fuel control system for a gas turbine engine having a burner and compressor, a valve for varying the rate of fuel feed to said burner, means for actuating said valve, means for controlling said actuating means during transient engine operation including a device calibrated as a function of engine speed, means for continuously resetting or indexing said device during changes in engine speed, means for transmitting a regulating force from said device to said valve actuating means, an all-speed governor operatively connected to said valve actuating means, means for adjusting said governor to select an engine operational speed, and means for modifying the action of said transmitting means as a function of the gas pressure and temperature characteristics of the engine.

29. In a fuel feed and power control system for a gas turbine engine having a burner to which air is supplied under pressure by a compressor, a throttle valve and associated engine speed governor including a governor spring, means including a pilot's control member for resetting said spring to accelerate and/or decelerate the engine, and means for automatically regulating the effective metering position of said valve during a transient condition following a resetting of said spring, said regulating means including a device operating as a function of engine speed and a separate device operating as a function of engine speed and compressor inlet pressure and temperature.

30. In a fuel feed and power control system for a gas turbine engine having a compressor, a combined throttle and metering valve, means associated with said valve providing a variable metering restriction, means for maintaining at all times during operation of the engine a substantially constant metering head across said restriction, means responsive to changes in engine speed and compressor inlet temperature and additional means responsive to compressor inlet pressure for automatically controlling the position of said valve to vary the area of said restriction.

References Cited in the file of this patent

UNITED STATES PATENTS

| | | |
|---|---|---|
| 2,489,586 | Ray | Nov. 29, 1949 |
| 2,581,276 | Mock | Jan. 1, 1952 |
| 2,691,268 | Prentiss | Oct. 12, 1954 |

FOREIGN PATENTS

| | | |
|---|---|---|
| 614,202 | Great Britain | Dec. 10, 1948 |